United States Patent Office 3,260,712
Patented July 12, 1966

3,260,712
ALKYL PHOSPHONIC AND THIOPHOSPHONIC ARYL ESTER AMIDES
Gerhard Schrader, Wuppertal-Cronenberg, Germany, assignor to Farbenfabriken Bayer Aktiengesellschaft, Leverkusen, Germany, a corporation of Germany
No Drawing. Filed July 17, 1961, Ser. No. 124,378
Claims priority, application Germany, Apr. 16, 1959, F 28,228
8 Claims. (Cl. 260—949)

This application is a continuation-in-part of application Serial No. 21,898, filed April 13, 1960, now abandoned.

The present invention relates to and has as its objects new and useful insecticidal (thio)phosphonic acid amides and processes for their production. Generally the new compounds of this invention may be represented by the following formula

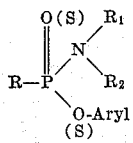

wherein R stands for an alkyl radical, $R_1$ stands for hydrogen, $R_1$ and $R_2$ stand also for alkyl radicals, preferably lower alkyl radicals, which also may be linked together to form together with the nitrogen atom a cyclic compound.

Alkyl-thionophosphonic acid amide chlorides as well as the corresponding alkyl-phosphonic acid amide chlorides of the general formula

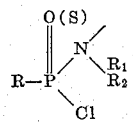

wherein R, $R_1$ and $R_2$ have the same significance as given above, are known in the literature (cf., e. g. B. A. Arbusow, N. I. Rizpoloshenski and N. A. Svereva, Izvest. Akid., SSSR (1955), 1021–1030).

It has been found that valuable insecticides are obtained by reacting these alkyl-thionophosphonic acid amide chlorides or alkyl-phosphonic acid amide chlorides with suitable phenols or thiophenols. Especially suitable phenols are inter alia: o-, m- and p-nitrophenols, alkylmercaptophenols, halophenols such as mono-, di- or tri-chlorophenols, alkyl-substituted phenols, phenols in which the aforementioned radicals are present in combination with each other, or the corresponding thiophenols. Also naphthols such as α- or β-naphthol are suitable. Furthermore such naphthols are suitable which are substituted as described above in the phenol series. Furthermore phenols of other condensed nuclear-type-series such as benzene hydroxy coumarins or derivatives thereof may be used according to this invention. The aforementioned list, however, should not limit the present invention in any way.

The following equation may illustrate the reaction:

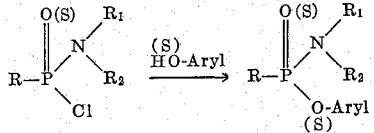

The condensation of the aforesaid phosphonic acid chlorides with the desired phenols is preferably carried out in the presence of a suitable acid-binding agent and, if desired, in the presence of an inert solvent. As an acid-binding agent, the alkali metal salts of the aforesaid phenols may also be used with advantage. As inert solvents, chiefly lower ketones or acetonitrile may be considered.

The new compounds have a good contact-insecticidal activity combined with a comparatively low toxicity.

As an example for the special utility of the compounds of the present invention the compound of the following formula

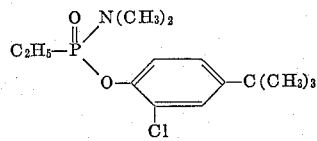

has been tested against spider mites. Aqueous dilutions of this compound have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting at last this premixture with water to the desired concentration indicated in the following paragraph.

The test has been carried out as follows (against spider mites): bean plants (*Phaseolus vulgaris*) of about 15 inches height are sprayed drip wet with solutions prepared as indicated above and in a concentration of 0.1%. The bean plants have been infested heavily with the two-spotted spider (species *Tetranychus telarius*). Evaluation has been carried out after 24 hours, 48 hours and 8 days. The following results have been obtained: Spider mites were killed completely.

The following examples are given for the purpose of illustrating the process according to the present invention:

*Example 1*

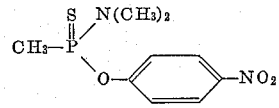

40 grams (0.25 mol) of sodium p-nitrophenate are dissolved in 150 cc. of methyl ethyl ketone. 40 grams (0.25 mol) of methyl-thionophosphonic acid dimethylamide chloride (B.P. 65° C./1 mm. Hg) are added at 50° C. with stirring. The temperature is maintained at 50° C. for a further hour and the reaction product then poured into 300 cc. of ice water. The separated oil is taken up in 200 cc. of benzene, washed neutral with water and subsequently dried with sodium sulfate. Upon distillation of the solvent, an oil remains which solidifies rapidly. Upon re-crystallisation from ethyl acetate/ligroin, the new ester has a melting point of 102° C. 42 grams of the new ester are thus obtained. Yield 65% of the theoretical. On rats per os $LD_{50}$ toxicity 500 mg./kg.

By exactly the same way but using instead of the above said starting materials the corresponding equimolecular amounts of p-nitro-m-chlorophenate there is obtained the following compound:

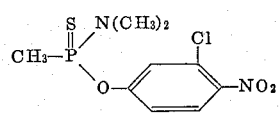

and using the equimolecular amounts of p-nitro-m-methylphenate there is obtained the following compound:

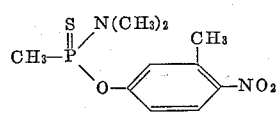

Example 2

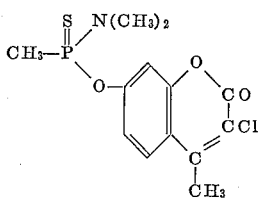

58 grams (0.25 mol) of the sodium salt of 3-chloro-4-methyl-7-hydroxy coumarin are dissolved in 250 cc. of acetonitrile. 40 grams (0.25 mol) of methyl-thionophosphonic acid dimethylamide chloride are added at 60° C. with stirring. The temperature is maintained at 70° C. for one hour and the product then worked up as described in Example 1. The crude ester solidifies rapidly in the form of crystals. Upon recrystallisation from equal parts of ethyl acetate/ligroin, the new ester has a melting point of 128° C. 40 grams of the new ester are obtained corresponding to 48% of the theoretical yield.

On rats per os 1000 mg./kg. of the new ester causes symptoms but no lethal effect.

By the same way there may be obtained the following compounds:

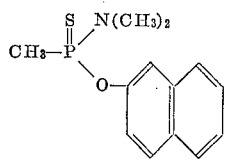

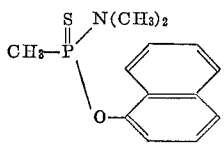

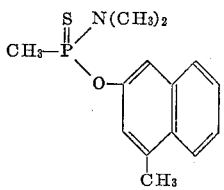

Example 3

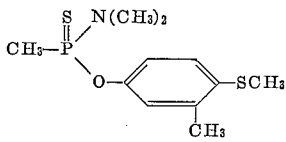

39 grams (0.25 mol) of 4-methylmercapto-3-methylphenol are dissolved in 100 cc. of methanol. A sodium methylate solution containing 0.25 mol of sodium is added to the solution. It is heated to 60° C. for one hour, 1000 cc. of benzene are added and benzene and methyl alcohol are then azeotropically distilled off. The residue is taken up in 200 cc. of methyl ethyl ketone. 40 grams (0.25 mol) of methyl-thionophosphonic acid dimethylamide chloride are then added at 40° C. with stirring. The mixture is kept at 50° C. for an hour and then worked up as described in Example 1. 49 grams of the new ester are thus obtained in the form of a colorless, water-insoluble oil which goes over at 122° C. under a pressure of 0.01 mm. Hg. Yield 71% of the theoretical.

On rats per os the new compound shows a toxicity of 50 mg./kg. $LD_{50}$.

Example 4

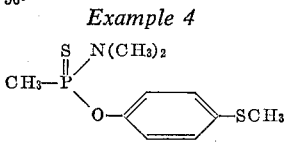

35 grams (0.25 mol) of p-methylmercaptophenol are dissolved in 100 cc. of methanol. A sodium methylate solution containing 0.25 mol of dissolved sodium is added with stirring. By the addition of benzene methyl alcohol is then azeotropically distilled off as described in the preceding examples. The residue is taken up in 200 cc. of methyl ethyl ketone. 40 grams of methyl-thionophosphonic acid dimethylamide chloride are subsequently added at 40° C. with stirring. The mixture is kept at 50° C. for a further hour and then worked up in usual manner. 51 grams of the new ester are thus obtained in the form of a colorless, water-insoluble oil which goes over at 113° C. under a pressure of 0.01 mm. Hg. Yield 78% of the theoretical. On rats per os $LD_{50}$ 50 mm./kg. toxicity. Spider mites are killed completely with 0.01% solutions. The ester shows a strong ovicidal action.

By exactly the same way but using instead of the above said starting material the corresponding equimolecular amount of methyl-thionophosphonic acid diethyl-amide chloride there is obtained the compound of the following formula

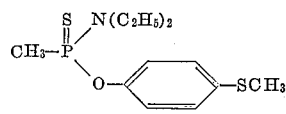

by using instead of the above mentioned methyl-thionophosphonic acid dimethylamide chloride the corresponding equimolecular amount of ethyl-thionophosphonic acid dimethylamide chloride there is obtained the following compound

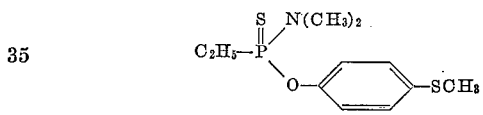

and by using instead of the above mentioned starting material the corresponding equimolecular amount of p-ethylmercaptophenol there is obtained the compound of the following formula

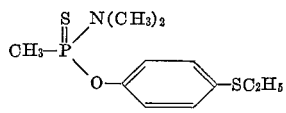

Example 5

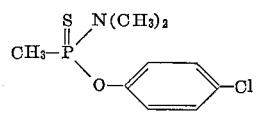

6 grams of powdered sodium are suspended in 100 cc. of benzene. 33 grams of p-chlorophenol are added at 50° C. The mixture is heated to 60° C. for an hour.

p-Chlorophenol is now converted into the sodium compound. 40 grams (0.25 mol) of methyl-thionophosphonic acid dimethylamide chloride are subsequently aded at 40° C. with stirring. The product is kept at 50° C. for a further hour and then worked up in usual manner. 42 grams of the ester of B.P. 102° C./0.01 mm. Hg are thus obtained. Yield 67% of the theoretical.

By exactly the same way but using instead of the above mentioned starting materials the equimolecular amount of the corresponding 3,4-chlorophenol there is obtained the compound of the following formula

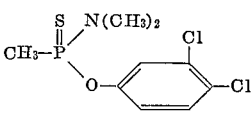

and using the corresponding equimolecular amount of methyl-thionophosphonic acid piperidide chloride there is obtained the compound of the following formula

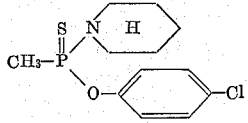

and using the corresponding equimolecular amount of methyl-thionophosphonic acid morpholide chloride there is obtained the following compound

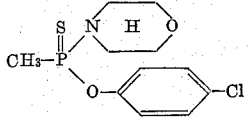

and using the corresponding equimolecular amount of n-hexyl-thionophosphonic acid dimethylamide chloride there is obtained the following compound

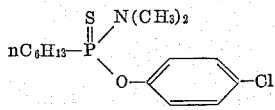

*Example 6*

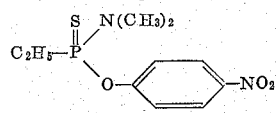

40 grams (0.25 mol) of sodium p-nitrophenate are dissolved in 150 cc. of methyl ethyl ketone. 43 grams (0.25 mol) of ethyl-thionophosphonic acid dimethylamide chloride (B.P. 72° C./1 mm. Hg) are added at 60° C. with stirring. The mixture is kept at 60° C. for an hour and then worked up in usual manner. 41 grams of the new ester are obtained as a colorless, water-insoluble oil of B.P. 125° C./0.01 mm. Hg. Yield 60% of the theoretical. On rats per os $LD_{50}$ toxicity 200 mg./kg.

By exactly the same way but using instead of the above mentioned starting materials the equimolecular amounts of the corresponding sodium p-nitro-o-chlorophenate there is obtained the following compound

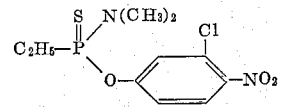

and with the equimolecular amounts of the corresponding cyclohexyl-thionophosphonic acid dimethylamide chloride there is obtained the following compound

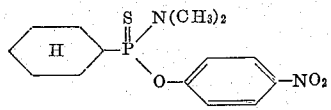

*Example 7*

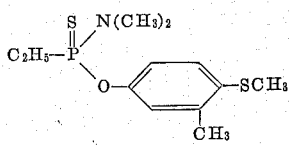

39 grams (0.25 mol) of 4-methylmercapto-3-methyl-phenol are dissolved in 100 cc. of methanol. A sodium methylate solution containing 0.25 mol of dissolved sodium is added. After the addition of benzene the methyl alcohol is azeotropically distilled off. The residue is taken up in 200 cc. of methyl ethyl ketone. 44 grams (0.25 mol) of ethyl-thionophosphonic acid dimethylamide chloride are added at 30° C. with stirring. The mixture is heated to 100° C. for a further hour and then worked up in usual manner. 48 grams of the new ester of B.P. 128° C./0.01 mm. Hg are obtained. Yield 67% of the theoretical. Aphids are killed completely with 0.01% solutions and spider mites are killed completely with 0.001% solutions.

In a similar manner the following compounds may be obtained:

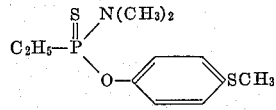

B.P. 116° C./0.01 mm. Hg, yield 71% of the theoretical, aphids and spider mites are killed completely with 0.01% solutions.

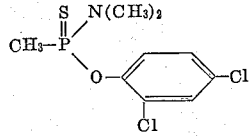

M.P. 47° C., yield 28% of the theoretical.

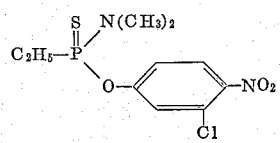

Water-insoluble, colorless oil, yield 45% of the theoretical.

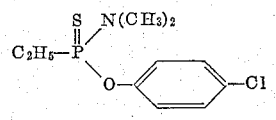

M.P. 85° C., yield 64% of the theoretical.

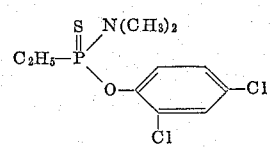

B.P. 126° C./0.01 mm. Hg, yield 39% of the theoretical.

*Example 8*

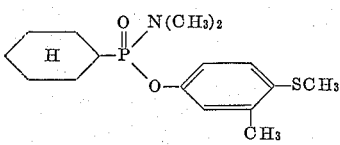

31 grams (2/10 mol) of p-methylmercapto-3-methyl-phenol are dissolved in 150 cc. of acetonitrile. A sodium methylate solution containing 2/10 mol of dissolved sodium is added with stirring. 42 grams (2/10 mol) of cyclohexyl-phosphonic acid dimethylamide chloride (B.P. 86° C./0.01 mm. Hg) are subsequently added at 40° C. Stirring is continued at 60° C. for 2 hours and the product is then worked up in usual manner. 61 grams of the new ester are obtained going over at 138° C. under a pressure of 0.01 mm. Hg. Upon prolonged standing the ester crystallises. Upon recrystallisation from ligroin/ethyl acetate, it has a melting point of 93° C. Aphids and spider mites are killed completely with 0.01% solutions.

By exactly the same way but using instead of the above mentioned starting materials the equimolecular amounts of the corresponding p-nitrophenol there is obtained the following compound

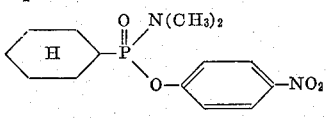

and when using the corresponding methyl-phosphonic acid dimethylamide chloride there is obtained the following compound

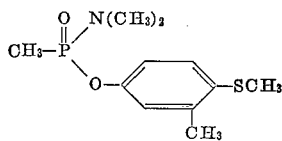

and when using the corresponding p-nitrophenol and the corresponding methyl-phosphonic acid dimethylamide chloride there is obtained the following compound

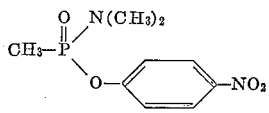

Example 9

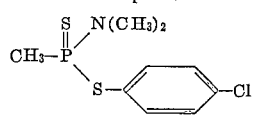

37 grams (0.25 mol) of 4-chlorophenyl mercaptan are dissolved in 100 cc. of anhydrous alcohol. A sodium ethylate solution containing 0.25 mol of dissolved sodium is added. The temperature is maintained at 60° C. for a further hour and 40 grams (0.25 mol) of methyl-thionophosphonic acid dimethylamide chloride (B.P. 65° C./1 mm. Hg) are added with stirring. The temperature is maintained at 60° C. for a further hour and the reaction product then poured into 300 cc. of water. The separated oil is taken up in benzene and washed neutral with water. After drying the benzene solution the solvent is removed in a vacuum. 54 grams of the new ester are thus obtained in the form of a pale yellow, water-insoluble oil. Yield 82% of the theoretical.

Calculated for mol 266: Cl, 13.4%; S, 24.1%; P, 11.6%; N, 5.3%. Found: Cl, 14.0%; S, 24.4%; P, 10.8%; N, 4.8%.

On rats per os the new ester has a toxicity of 250 mg./kg. $LD_{50}$.

By the same way there may be obtained the compounds of the following formulae:

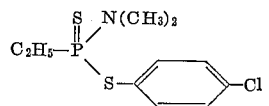

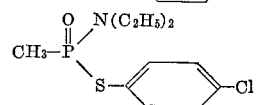

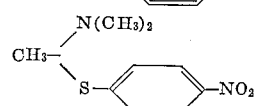

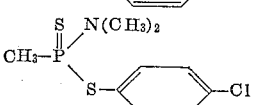

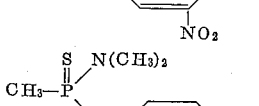

Example 10

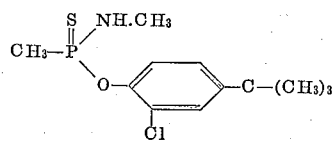

46 grams (0.25 mol) of 4-tert.-butyl-2-chlorophenol are dissolved in 200 cc. of benzene. 40 grams of anhydrous potassium carbonate are added with stirring and then 36 grams of methyl-thionophosphonic acid methylamide chloride (B.P. 75°/1 mm. Hg) are added dropwise at 80° C. with further stirring. Stirring is continued at 80° C. for 4 hours. Then the mixture is cooled to room-temperature, the salts are filtered off with suction and the filtrate is poured into 500 cc. of water. The separated oil is taken up in benzene and the solution is dried over sodium sulphate. After distilling off the solvent 38 grams of the new ester are obtained, corresponding to 52% of the theoretical yield.

Analysis.—Calculated for mol 292: S, 11.0%; P, 10.6%; Cl, 12.2%; N, 4.8%. Found: S, 11.05%; P, 10.2%; Cl, 12.2%; N, 4.5%.

On rats per os $LD_{50}$ toxicity 100 mg./kg.

0.01% solutions kill flies to 70% and spider mites to 50%.

Example 11

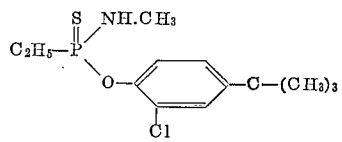

Under the same conditions but using 46 grams (0.25 mol) of 4-tert.-butyl-2-chlorophenol and 40 grams of ethyl-thionophosphonic-methylamide chloride (B.P. 84° C./1 mm. Hg) there are obtained 51 grams of the new ester corresponding to 67% of the theoretical yield.

Analysis.—Calculated for mol 306: S, 10.5%; P, 10.1%; Cl, 11.6%; N, 4.6%. Found: S, 10.3%; P, 10.9%; Cl, 12.0%; N, 4.3%.

On rats per os $LD_{50}$ toxicity 100 mg./kg.

Flies and spider mites are killed completely with 0.01% solutions.

Example 12

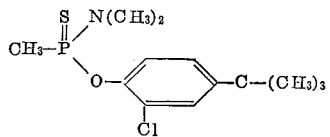

Under similar conditions but using instead of the above said starting materials 94 grams (0.5 mol) of 4-tert.-butyl-2-chlorophenol and 79 grams of methyl-thionophosphonic acid dimethylamide chloride (B.P. 65°/1 mm. Hg) are obtained 117 grams of the new ester, corresponding to 76% of the theoretical yield.

Analysis.—Calculated for mol 306: S, 10.5%; Cl, 11.6%; N, 4.6%; P, 10.1%. Found: S, 10.0%; Cl, 12.0%; N, 4.2%; P, 9.4%.

On rats per os $LD_{50}$ toxicity 500 mg./kg.

Flies are destroyed to 95% with 0.01% solutions.

Example 13

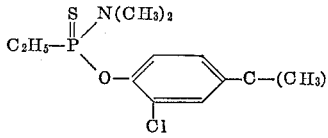

Under the same conditions from 94 grams (0.5 mol) 4-tert.-butyl-2-chlorophenol and 86 grams of ethyl-thionophosphonic acid dimethylamide chloride (B.P. 72° C./1 mm. Hg) there are obtained 95 grams of the new ester. Yield 59% of the theoretical.

Analysis.—Calculated for mol 320: S, 10.0%; P, 9.7%; Cl, 11.1%; N, 4.4%. Found: S, 10.0%; P, 9.4%; Cl, 11.4%; N, 4.1%.

On rats per os toxicity 1000 mg./kg.

Flies are killed completely with 0.1% solutions.

Example 14

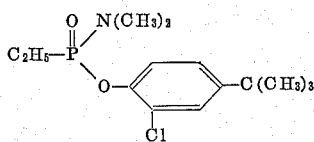

64 grams (0.5 mol) of 4-tert.-butyl-2-chlorophenol are dissolved in 200 cc. of methanol. A sodium methylate solution containing 0.5 mol of sodium is added to the solution. The reaction mixture is heated to 60° C. for half an hour and then the methyl alcohol is removed by azeotropic distillation with benzene. The remaining sodium salt of the 4-tert.-butyl-2-chlorophenol is dissolved in 400 cc. of methyl ethyl ketone and 78 grams (0.5 mol) of ethyl phosphonic acid dimethyl amide chloride (B.P. 75° C./1 mm. Hg) are added at 30–40° C. while stirring. The mixture is stirred for one further hour at 40° C. and then the reaction mixture is poured into 500 cc. of ice water. The separated oil is taken up in benzene and the benzenic solution is dried over sodium sulphate. After distilling off the solvent 132 grams of the ester are obtained in the form of a pale yellow water-insoluble oil. Yield 87% of the theoretical.

Aphids and spider mites are killed completely with 0.1% solutions.

I claim:
1. A compound of the formula

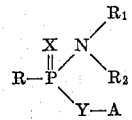

wherein R stands for a member selected from the group consisting of lower alkyl and cyclohexyl,

stands for a member selected from the group consisting of dilower alkyl amino, piperidino and morpholino, X and Y stand for a chalcogen having an atomic number from 8 to 16, at least one being 16, and A stands for a disubstituted phenyl selected from the group consisting of mononitro and monochloro substituted phenyl, monolower alkyl and monolower alkyl mercapto substituted phenyl and monochloro and monolower alkyl substituted phenyl.

2. Compound of the formula

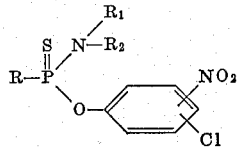

wherein R, $R_1$ and $R_2$ stand for lower alkyl.

3. A compound of the formula

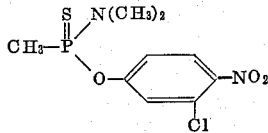

4. A compound of the formula

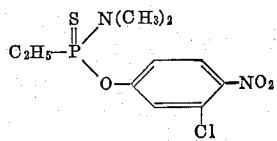

5. A compound of the formula

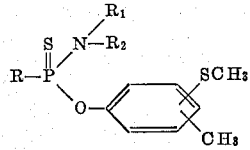

wherein $R_1$ and $R_2$ stand for lower alkyl and R stands for cyclohexyl.

6. A compound of the formula

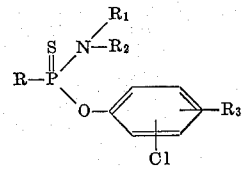

wherein R, $R_1$, $R_2$ and $R_3$ stand for lower alkyl.

7. The compound of the following formula

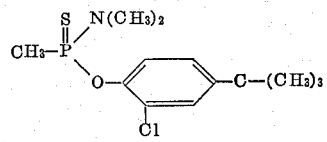

8. The compound of the following formula

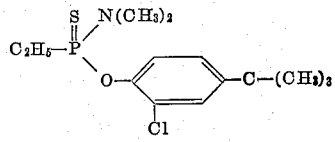

References Cited by the Examiner

UNITED STATES PATENTS

| | | | |
|---|---|---|---|
| 2,668,839 | 2/1954 | Tolkmith | 260—461.306 |
| 2,668,840 | 2/1954 | Tolkmith | 260—461.306 |
| 2,765,276 | 10/1956 | Van Winkle et al. | 260—461.106 |
| 2,894,019 | 7/1959 | Maeder | 260—461.106 |
| 2,910,402 | 10/1959 | Fairchild | 260—461.110 XR |
| 2,967,884 | 1/1961 | Dunn et al. | 260—461.106 |
| 3,010,986 | 11/1961 | Reetz | 260—461.106 |
| 3,018,301 | 1/1962 | Schrader | 260—461.106 |
| 3,038,924 | 6/1962 | Schoot et al. | 260—461.106 |
| 3,099,674 | 7/1963 | Schrader | 260—461.106 |
| 3,113,005 | 12/1963 | Gilbert et al. | 260—461.106 XR |

FOREIGN PATENTS

| | | |
|---|---|---|
| 194,859 | 1/1958 | Austria. |
| 589,734 | 4/1960 | Belgium. |

OTHER REFERENCES

Razumov: "Chem. Abst.," 52, col. 7193 (1958).

CHARLES B. PARKER, *Primary Examiner.*

MORRIS LIEBMAN, JOSEPH P. BRUST, *Examiners.*

J. R. GENTRY, F. M. SIKORA, R. L. RAYMOND,
*Assistant Examiners.*